(12) United States Patent
Bates

(10) Patent No.: US 12,103,053 B1
(45) Date of Patent: Oct. 1, 2024

(54) PORTABLE GRILL GRATE WASHING MACHINE

(71) Applicant: Marlon Bates, Randallstown, MD (US)

(72) Inventor: Marlon Bates, Randallstown, MD (US)

( * ) Notice: Subject to any disclaimer, the term of this patent is extended or adjusted under 35 U.S.C. 154(b) by 274 days.

(21) Appl. No.: 17/740,427

(22) Filed: May 10, 2022

(51) Int. Cl.
| | |
|---|---|
| *A47J 37/07* | (2006.01) |
| *B08B 3/02* | (2006.01) |
| *B08B 3/10* | (2006.01) |
| *F24H 1/00* | (2022.01) |

(52) U.S. Cl.
CPC .......... *B08B 3/024* (2013.01); *A47J 37/0786* (2013.01); *B08B 3/10* (2013.01); *B08B 2203/007* (2013.01); *B08B 2203/027* (2013.01); *F24H 1/0072* (2013.01)

(58) Field of Classification Search
None
See application file for complete search history.

(56) References Cited

U.S. PATENT DOCUMENTS

| | | |
|---|---|---|
| 3,158,160 A | 11/1964 | Estandian |
| 3,469,586 A | 9/1969 | Berson |
| 4,420,005 A | 12/1983 | Armstrong |
| 5,035,516 A | 7/1991 | Pacheco |
| 5,518,014 A | 5/1996 | McEachen |
| 10,743,738 B2 | 8/2020 | Stecik |
| D904,703 S | 12/2020 | Callahan |
| 2018/0228339 A1* | 8/2018 | Stecik ..................... A47L 13/34 |

FOREIGN PATENT DOCUMENTS

| | | |
|---|---|---|
| WO | 2016060614 | 4/2016 |

* cited by examiner

*Primary Examiner* — Levon J Shahinian
(74) *Attorney, Agent, or Firm* — Kyle A. Fletcher, Esq.

(57) ABSTRACT

The portable grill grate washing machine is configured for use with a grate. The portable grill grate washing machine is a mechanical structure used to clean a grate. The portable grill grate washing machine incorporates a containment structure, a cleaning structure, and a debris drawer. The cleaning structure mounts in the containment structure. The debris drawer inserts into the containment structure. The grate inserts into the containment structure for cleaning. The cleaning structure sprays water cleans the grate by spraying water on the grate. The debris drawer collects debris that is dislodged from the cleaning structure during the cleaning process.

16 Claims, 9 Drawing Sheets

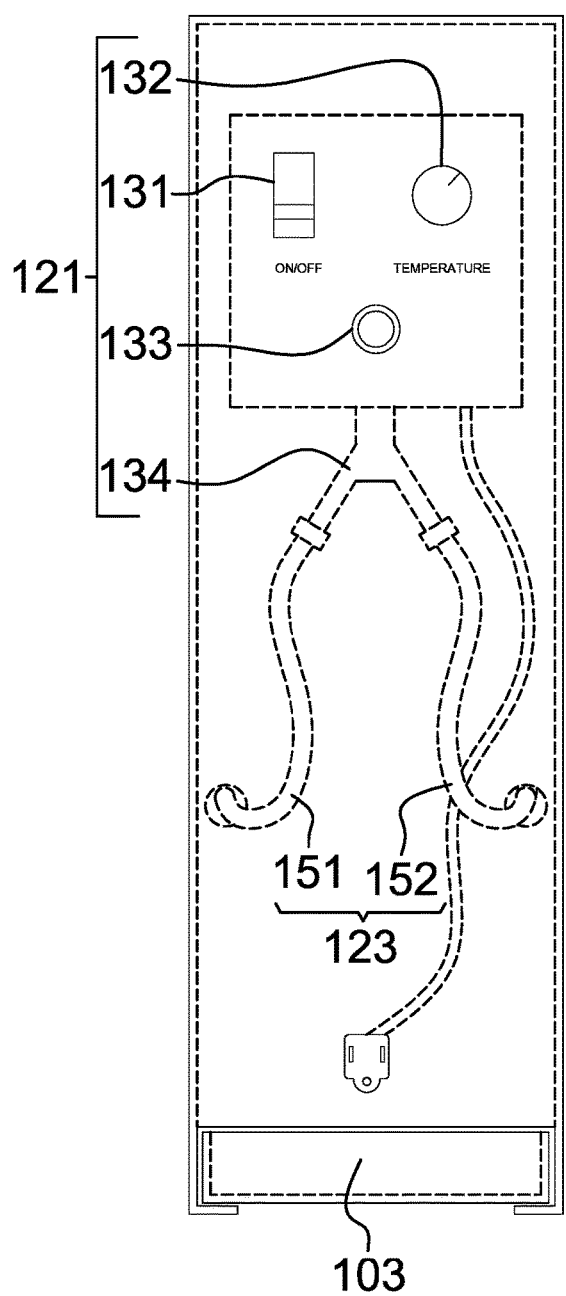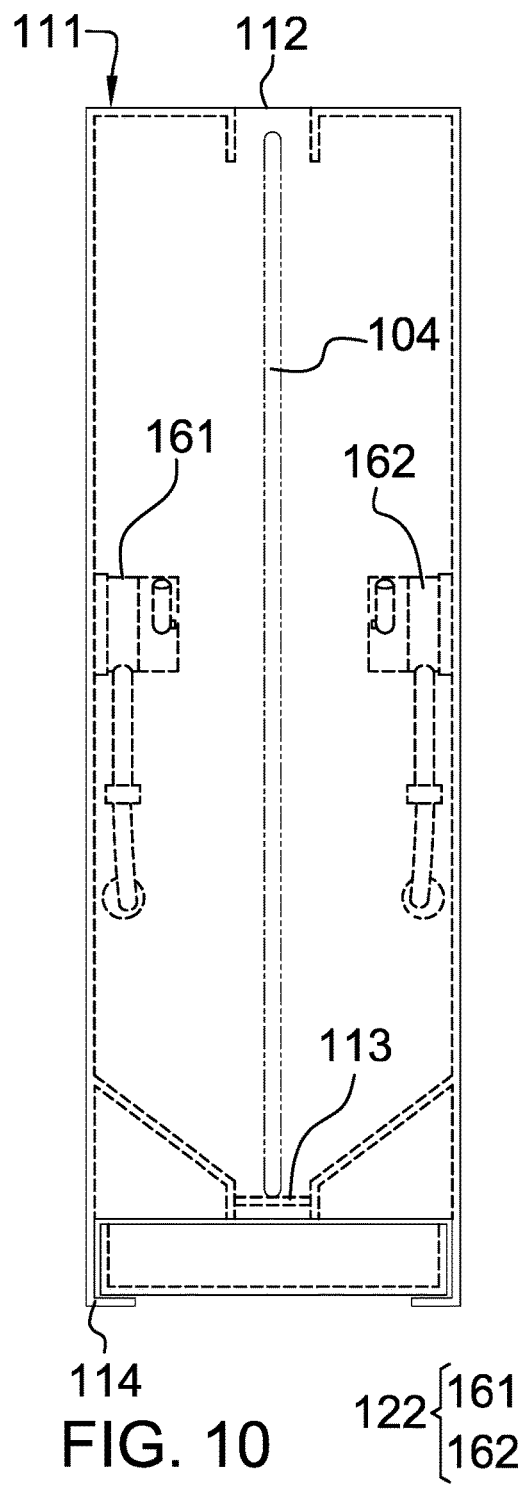

PORTABLE GRILL GRATE WASHING MACHINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of miscellaneous cleaning devices.

SUMMARY OF INVENTION

The portable grill grate washing machine is configured for use with a grate. The portable grill grate washing machine is a mechanical structure used to clean a grate. The portable grill grate washing machine comprises a containment structure, a cleaning structure, and a debris drawer. The cleaning structure mounts in the containment structure. The debris drawer inserts into the containment structure. The grate inserts into the containment structure for cleaning. The cleaning structure sprays water cleans the grate by spraying water on the grate. The debris drawer collects debris that is dislodged from the cleaning structure during the cleaning process.

These together with additional objects, features and advantages of the portable grill grate washing machine will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable grill grate washing machine in detail, it is to be understood that the portable grill grate washing machine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable grill grate washing machine.

It is therefore important that the claims be regarded as including such equivalent construction insofar as they do not depart from the spirit and scope of the portable grill grate washing machine. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 9 is a front view of an alternate embodiment of the 23 disclosure.
FIG. 10 is a rear view of an alternate embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
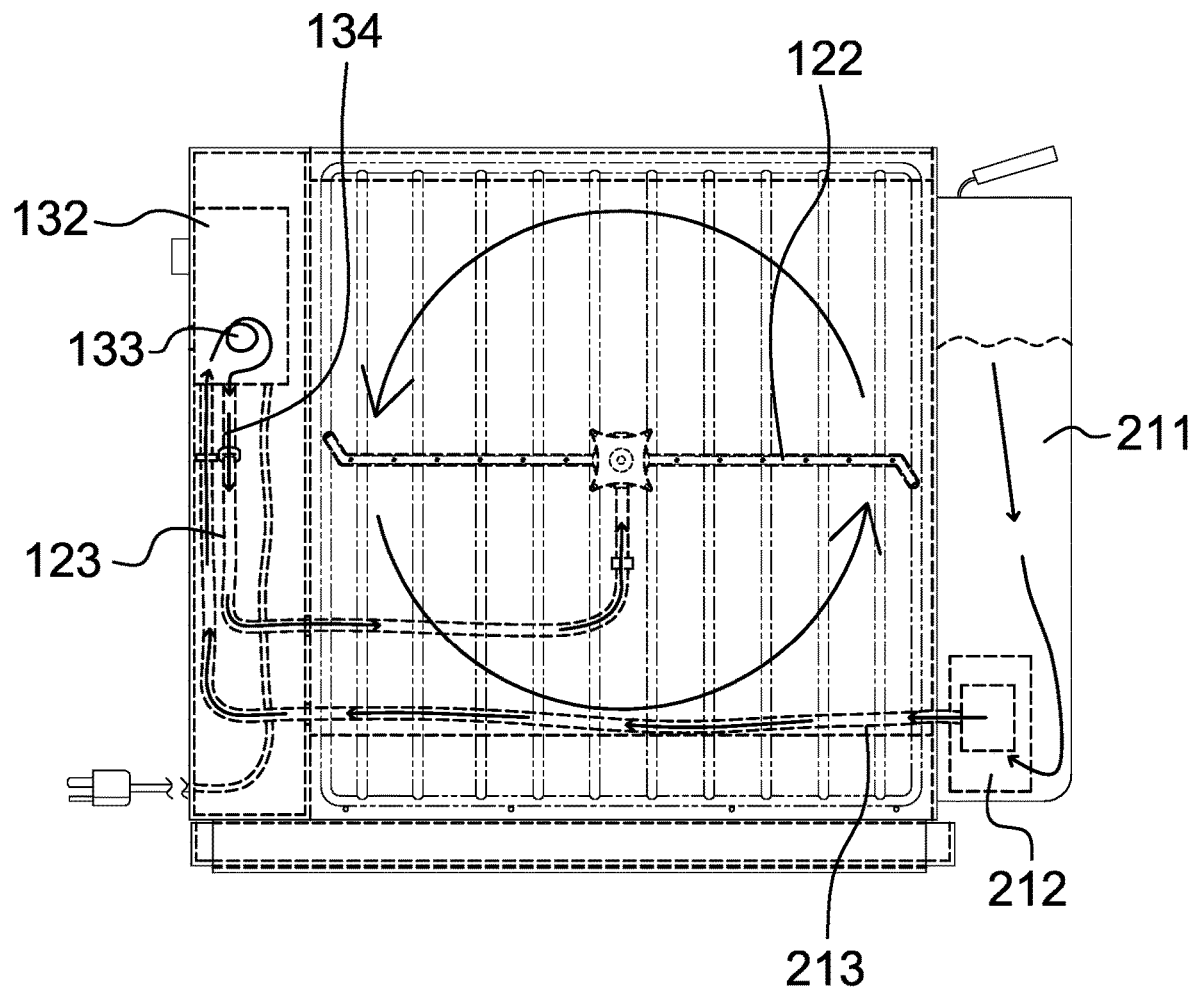
FIG. 1 is a side view of an embodiment of the disclosure.
Figure 2:
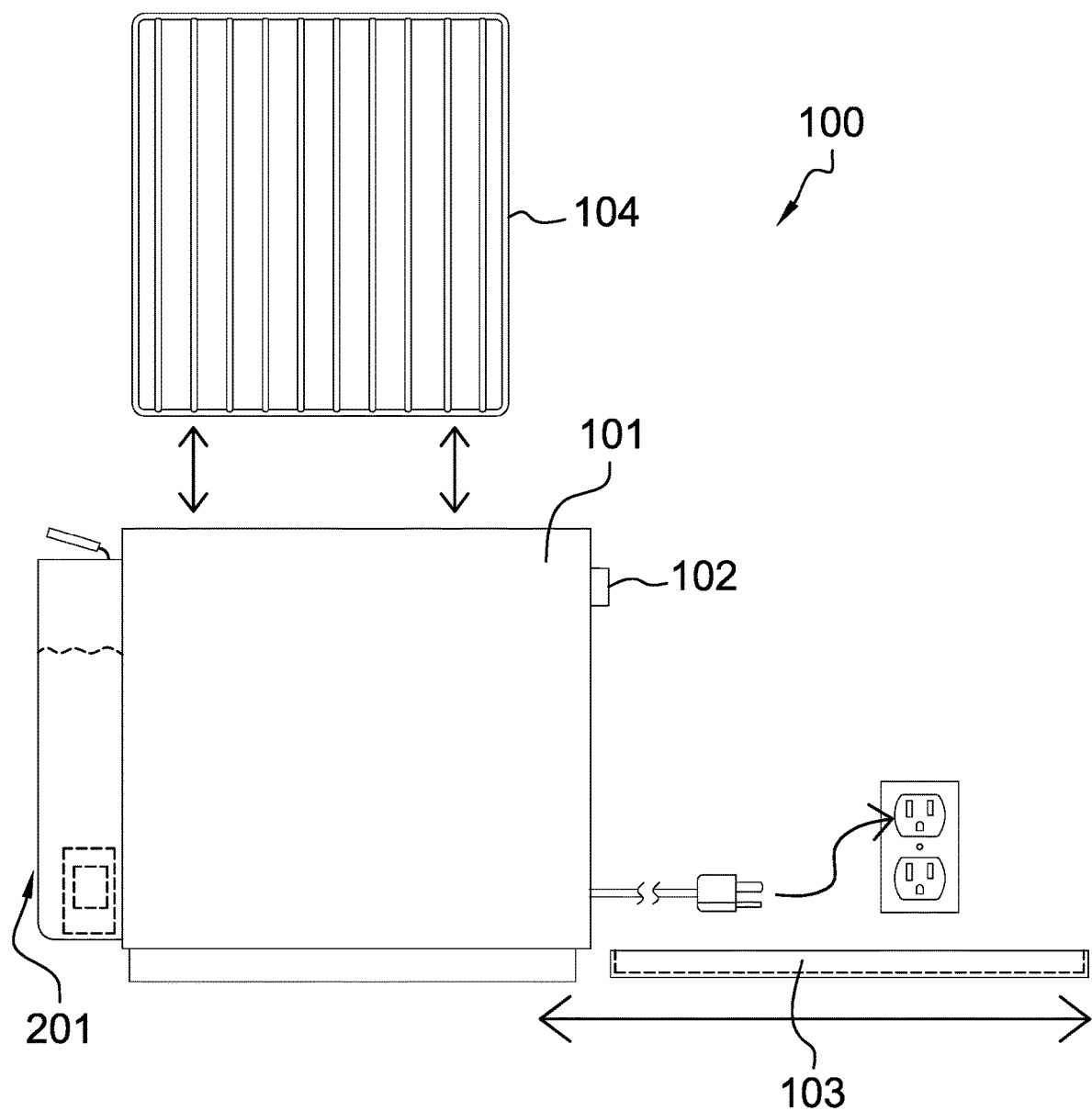
FIG. 2 is an in-use view of an embodiment of the disclosure.
Figure 3:
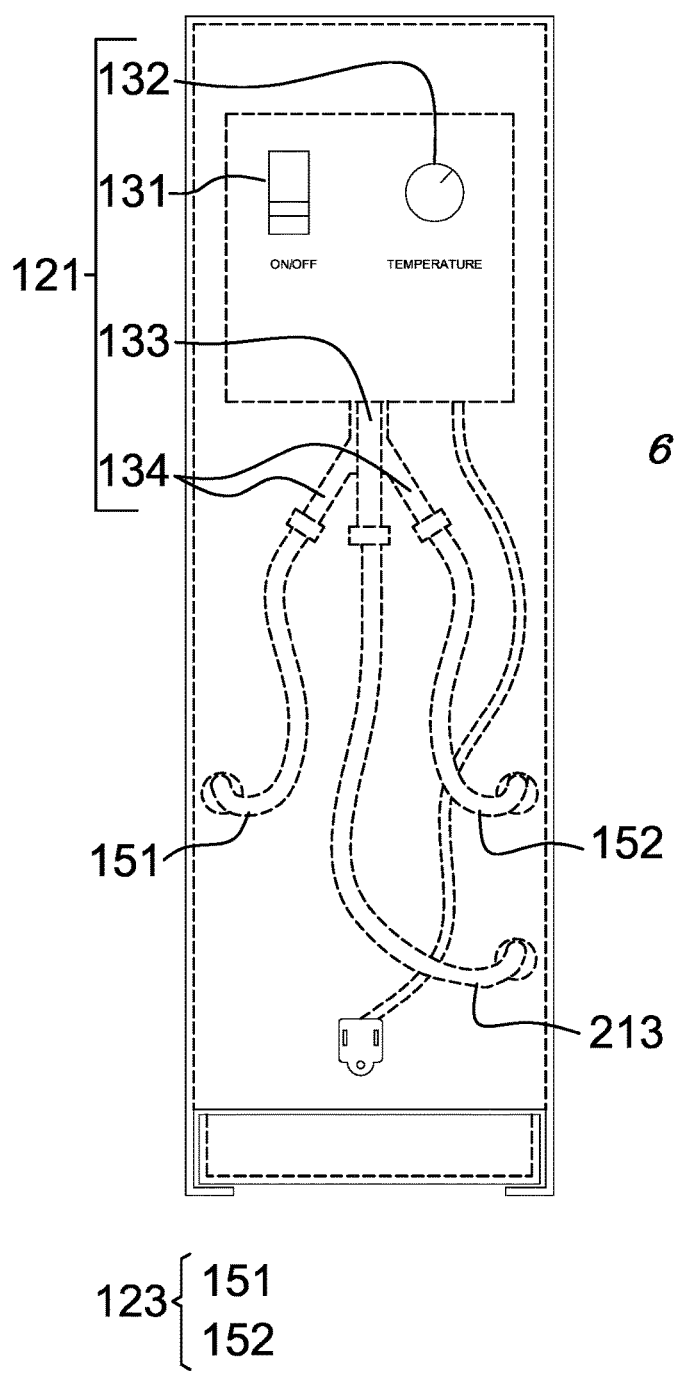
FIG. 3 is a front view of an embodiment of the disclosure.
Figure 4:
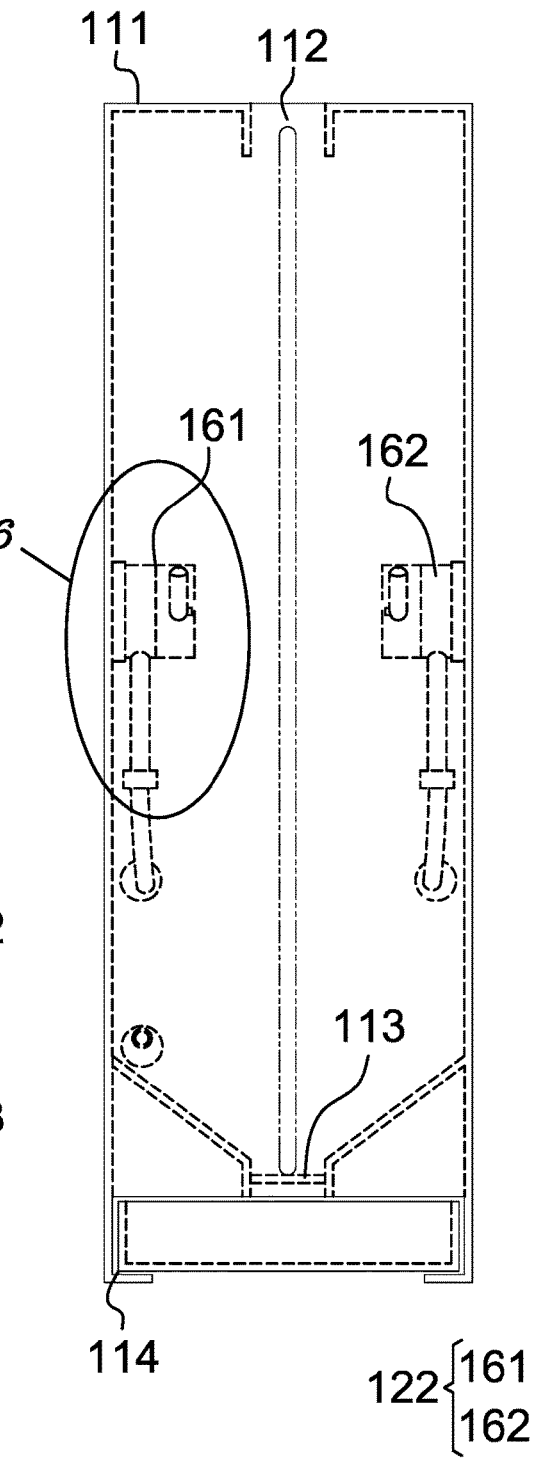
FIG. 4 is a rear view of an embodiment of the disclosure.
Figure 5:
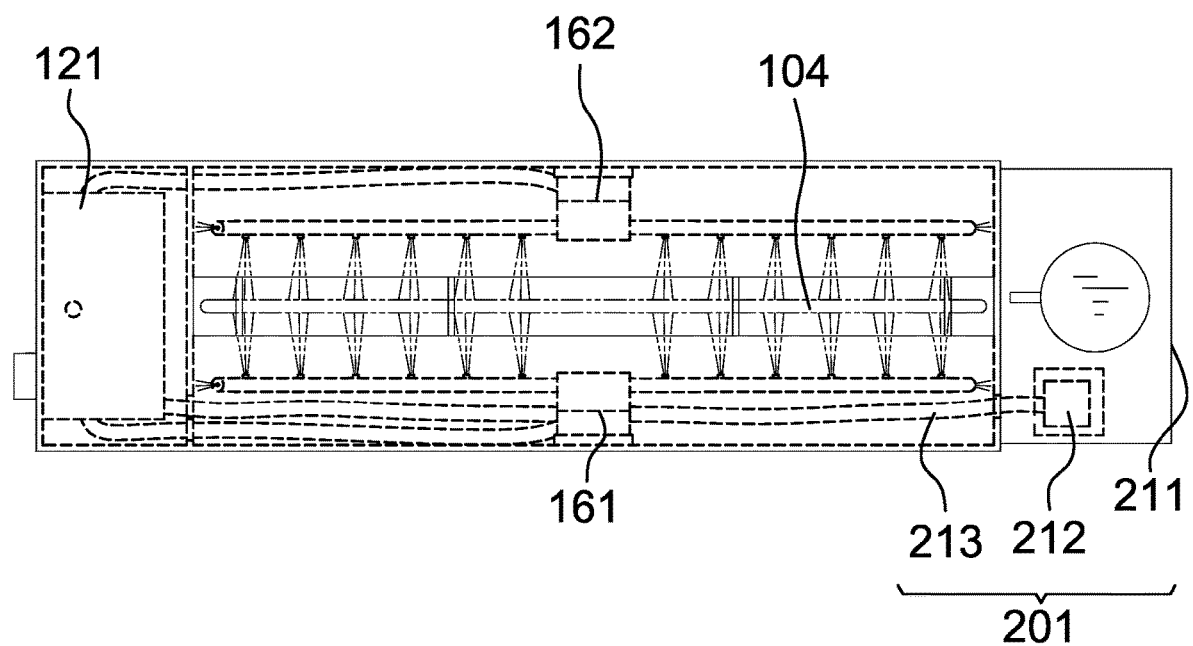
FIG. 5 is a top view of an embodiment of the disclosure.
Figure 6:
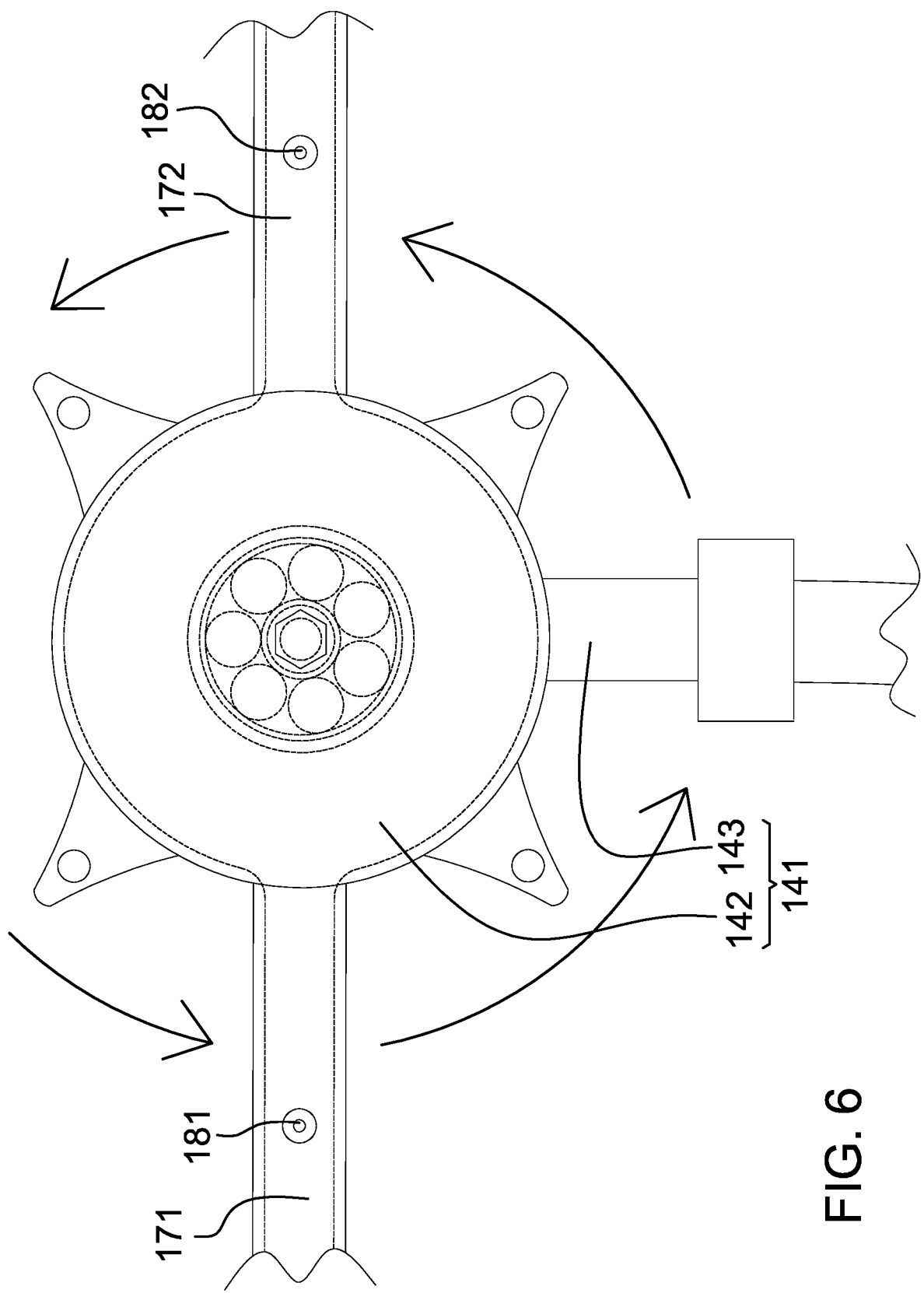
FIG. 6 is a detail view of an embodiment of the disclosure.
Figure 7:
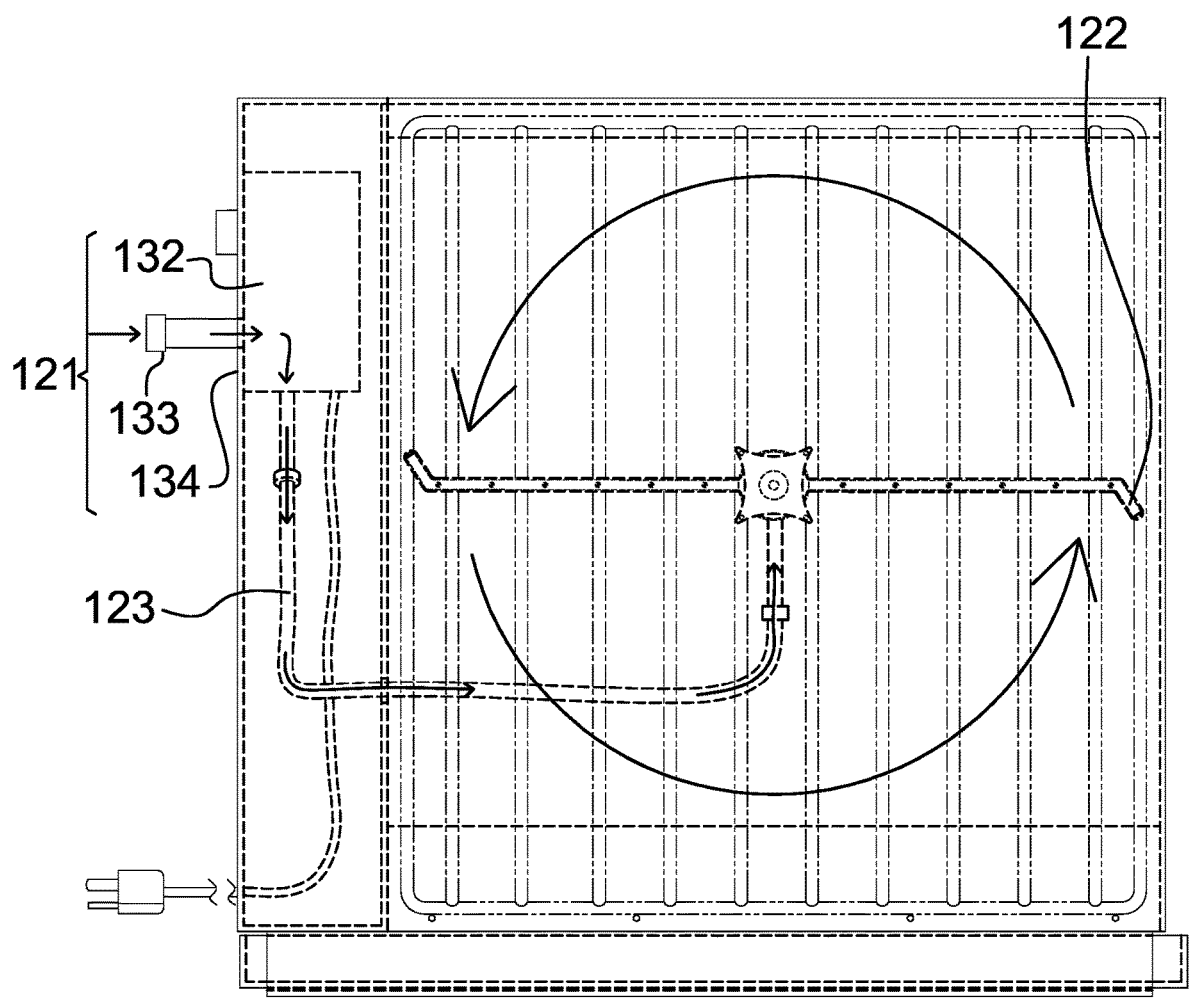
FIG. 7 is a side view of an alternate embodiment of the disclosure.
Figure 8:
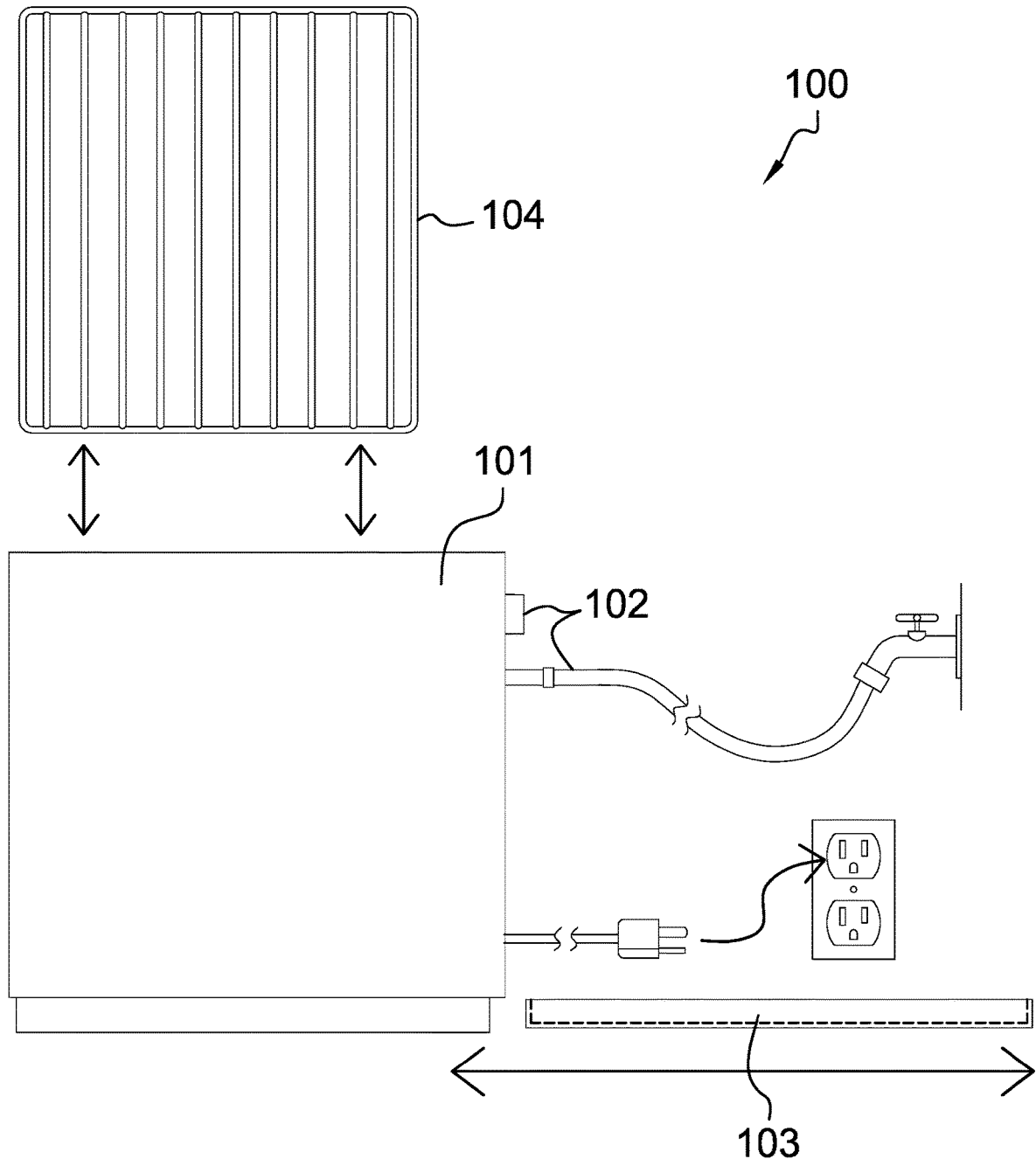
FIG. 8 is an in-use view of an alternate embodiment of the disclosure.
Figure 11:
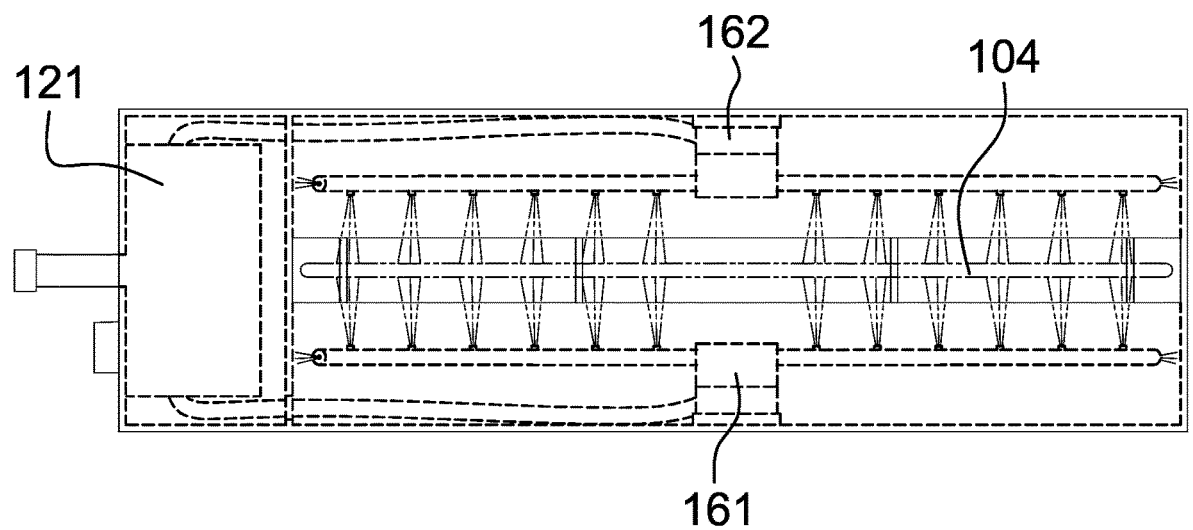
FIG. 11 is a top view of an alternate embodiment of the disclosure.

Detailed reference will now be made to one or more potential embodiments of the disclosure, which are illustrated in FIGS. 1 through 6.

The portable grill grate washing machine 100 (hereinafter invention) is configured for use with a grate 104. The invention 100 is a mechanical structure used to clean a grate 104. The invention 100 comprises a containment structure 101, a cleaning structure 102, and a debris drawer 103. The cleaning structure 102 mounts in the containment structure 101. The debris drawer 103 inserts into the containment structure 101. The grate 104 inserts into the containment structure 101 for cleaning. The cleaning structure 102 sprays water cleans the grate 104 by spraying water on the grate 104. The debris drawer 103 collects debris that is dislodged from the cleaning structure 102 during the cleaning process.

The grate 104 is a mesh structure formed from metal. The grate 104 has a roughly disk shape. The grate 104 is defined elsewhere in this disclosure.

The containment structure 101 is a mechanical structure. The containment structure 101 is a prism shaped structure. The containment structure 101 is a hollow structure. The containment structure 101 creates a protection space that contains the water used in the cleaning of the grate 104 within the hollow interior of the containment structure 101. The grate inserts into the containment structure 101. The debris drawer 103 inserts into the containment structure 101. The cleaning structure 102 mounts in the containment structure 101. The containment structure 101 comprises a containment housing 111, a grate 104 slot 112, a grate 104 rest 113, and a debris drawer 103 slot 114.

The containment housing 111 is a prism shaped structure. The containment housing 111 is a hollow structure. The containment housing 111 forms the primary shape of the containment structure 101. The containment housing 111 forms the solid exterior surfaces of the containment structure 101. The containment housing 111 forms the boundary structure of the protection space formed by the containment structure 101. The containment housing 111 is a fluid impermeable structure such that the water discharged by the cleaning structure 102 remains contained within the hollow interior of the containment housing 111.

The grate 104 slot 112 is a slot that is formed through the superior surface of the prism structure of the containment housing 111. The grate 104 inserts into the protection space formed by the containment housing 111 through the grate 104 slot 112. The grate 104 is removed from the protection space formed by the containment housing 111.

The grate 104 rest 113 is a mechanical structure that is formed in the protection space formed by the containment housing 111. The grate 104 rest 113 is a horizontally oriented platform. The grate 104 rests on the grate 104 rest 113. The grate 104 rest 113 elevates the grate 104 above the debris drawer 103 when the grate 104 is inserted into the containment housing 111.

The debris drawer 103 slot 114 is a negative space that is formed through a vertically oriented face of the prism structure of the containment housing 111. The debris drawer 103 slot 114 provides access into the protection space formed by the containment housing 111. The debris drawer 103 inserts into and is removed from the protection space formed by the containment housing 111 through the debris drawer 103 slot 114.

The cleaning structure 102 is a fluidic network. The cleaning structure 102 receives water from a source of water. The source of water provides the water under pressure. The cleaning structure 102 controls the flow of water into the 13 cleaning structure 102. The cleaning structure 102 heats the water as it enters the fluidic cleaning structure 102. The cleaning structure 102 transports the heated water to the grate 104. The cleaning structure 102 cleans the grate 104 by discharging the transported water directly onto the grate 104. The cleaning structure 102 comprises a water heater 121, a plurality of spray structures 122, and a plurality of fluidic connectors 123.

The water heater 121 forms a fluidic connection between the source of pressurized water and the plurality of fluidic connectors 123. The water heater 121 receives the water from the source of pressurized water. The water heater 121 heats the received water. The water heater 121 transports the heated water under pressure to the plurality of fluidic connectors 123. The water heater 121 comprises a flow control 131, a temperature control device 132, a water intake 133, and a discharge manifold 134.

The water intake 133 is a fitting that forms a fluidic connection between the flow control 131 and the source of pressurized water. The flow control 131 is a mechanical structure that controls the volume of the flow of the water received from the source of pressurized water into the temperature control device 132. The temperature control device 132 is device that heats the water received from the source of pressurized water to a predetermined temperature before the water flows into the discharge manifold 134. The discharge manifold 134 is a manifold that transports the heated water from the temperature control device 132 into the plurality of fluidic connectors 123. The discharge manifold 134 forms a fluidic connection with the temperature control device 132. The 19 discharge manifold 134 forms a fluidic connection with each fluidic connector contained in the plurality of fluidic connectors 123.

The plurality of spray structures 122 comprises a collection of individual spray structures 141. Each individual spray structure 141 selected from the plurality of spray structures 122 is a mechanical structure. Each individual spray structure 141 selected from the plurality of spray structures 122 is contained within the protection space formed by the containment housing 111. Each individual spray structure 141 selected from the plurality of spray structures 122 forms a fluidic connection with a fluidic connector selected from the plurality of fluidic connectors 123. Each individual spray structure 141 selected from the plurality of spray structures 122 receives the heated water under pressure from the selected fluidic connector. Each individual spray structure 141 selected from the plurality of spray structures 122 discharges the received heated water directly on the grate 104 inserted into the protection space formed by the containment housing 111.

Each individual spray structure 141 selected from the plurality of spray structures 122 is a rotating structure. The rotation of each individual spray structure 141 ensures that the heated water discharged by the individual spray structure 141 is evenly distributed over the grate 104. Each individual spray structure 141 selected from the plurality of spray structures 122 is identical.

Each individual spray structure 141 selected from the plurality of spray structures 122 forms a fluidic connection with a fluidic connector selected from the plurality of fluidic connectors 123. Each individual spray structure 141 receives heated water through the selected fluidic connector. Each individual spray structure 141 discharges the received heated water directly on the grate 104.

Each individual spray structure 141 comprises a collection of spray structure intake 142, a spray structure rotary union 143, a first spray arm 171, and a second spray arm 172.

The spray structure intake 142 is a fitting. The spray structure intake 142 forms the fluidic connection between the spray structure rotary union 143 of the individual spray structure 141 and the fluidic connector associated with the individual spray structure 141. The spray structure intake 142 transports the heated water received from the associated fluidic connector and to the spray structure rotary union 143.

The spray structure rotary union 143 is a rotary union. The rotary union is defined elsewhere in this disclosure. The spray structure rotary union 143 forms a fluidic connection with spray structure intake 142. The spray structure rotary union 143 forms a fluidic connection with first spray arm 171. The spray structure rotary union 143 forms a fluidic connection with second spray arm 172. The spray structure rotary union 143 transports the heated water received from the spray structure intake 142 to both the first spray arm 171 and the second spray arm 172. The spray structure rotary union 143 further diverts some of the momentum of the mass flow of the heated water flowing through the spray structure intake 142 to rotate both the first spray arm 171 and the second spray arm 172.

In the first potential embodiment of the disclosure, the plurality of spray structures 122 comprises a first spray structure 161 and a second spray structure 162. The first spray arm 171 further comprises a first plurality of cleaning nozzles 181. The second spray arm 172 further comprises a second plurality of cleaning nozzles 182. The first spray structure 161 is a first individual spray structure 141 selected from the plurality of spray structures 122. The first spray structure 161 is a second individual spray structure 141 selected from the plurality of spray structures 122. The second spray structure 162 is a first individual spray structure 141 selected from the plurality of spray structures 122. The second spray structure 162 is a second individual spray structure 141 selected from the plurality of spray structures 122.

The first spray arm 171 is a prism shaped tubular structure that forms a fluidic connection with the spray structure rotary union 143. The first spray arm 171 forms a fluidic connection that transports the heated water received from the spray structure rotary union 143 to the first plurality of cleaning nozzles 181. The spray structure rotary union 143 rotates the first spray arm 171 within the protection space formed by the containment housing 111 when water is flowing through the individual spray structure 141. Each cleaning nozzle selected from the first plurality of cleaning nozzles 181 mounts in the lateral face of the tubular structure of the first spray arm 171. Each cleaning nozzle selected from the first plurality of cleaning nozzles 181 is a spray nozzle. Each cleaning nozzle selected from the first plurality of cleaning nozzles 181 discharges the heating water received from the first spray arm 171 directly onto the grate 104.

The second spray arm 172 is a prism shaped tubular structure that forms a fluidic connection with the spray structure rotary union 143. The second spray arm 172 forms a fluidic connection that transports the heated water received from the spray structure rotary union 143 to the second plurality of cleaning nozzles 182. The spray structure rotary union 143 rotates the second spray arm 172 within the protection space formed by the containment housing 111 when water is flowing through the individual spray structure 141. Each cleaning nozzle selected from the second plurality of cleaning nozzles 182 mounts in the lateral face of the tubular structure of the second spray arm 172. Each cleaning nozzle selected from the second plurality of cleaning nozzles 182 is a spray nozzle. Each cleaning nozzle selected from the second plurality of cleaning nozzles 182 discharges the heating water received from the second spray arm 172 directly onto the grate 104.

Each fluidic connector selected from the plurality of fluidic connectors 123 is associated with an individual spray structure 141 selected from the plurality of spray structures 122. Each fluidic connector selected from the plurality of fluidic connectors 123 forms a fluidic connection with the selected individual spray structure 141. Each fluidic connector selected from the plurality of fluidic connectors 123 forms a fluidic connection with the water heater 121. Each fluidic connector selected from the plurality of fluidic connectors 123 transports the heated water received under pressure to the individual spray structure 141 associated with the selected fluidic connector. The plurality of fluidic connectors 123 further comprises a first fluidic connector 151 and a second fluidic connector 152.

The first fluidic connector 151 is the fluidic connector selected from the plurality of fluidic connectors 123 that forms the fluidic connection between the discharge manifold 134 and the first spray structure 161 selected from the plurality of spray structures 122. The second fluidic connector 152 is the fluidic connector selected from the plurality of fluidic connectors 123 that forms the fluidic connection between the discharge manifold 134 and the second spray structure 162 selected from the plurality of spray structures 122.

The debris drawer 103 is a prism shaped structure. The debris drawer 103 is a hollow structure. The debris drawer 103 has a pan shape. The open face of the pan shape of the debris drawer 103 forms the superior face of the prism structure of the debris drawer 103 when the debris drawer 103 is inserted into the containment structure 101. The debris drawer 103 forms the inferior structure contained within the hollow interior of the containment structure 101. The debris drawer 103 removably inserts into the containment structure 101 through the grate 104 slot 112 of the containment structure 101. The debris drawer 103 forms an accumulating structure that collects the debris released from the grate 104 by the cleaning structure 102.

In a second potential embodiment of the disclosure, the invention 100 further comprises a reservoir 211 structure 201. The reservoir 211 structure 201 is a source of pressurized water. The reservoir 211 structure 201 feeds pressurized water into cleaning structure 102. The reservoir 211 structure 201 comprises a reservoir 211, a pump 212, and a water feed connection 213. The pump 212 forms a fluidic connection between the reservoir 211 and the water feed connection 213.

The reservoir 211 forms a protected space that is used to store the water used to supply the cleaning structure 102. The pump 212 draws water out of the reservoir 211.

The pump 212 is a mechanical device. The pump 212 generates a pressure differential that transports the water from the reservation 211 into the water feed connection 213.

The water feed connection 213 forms a fluidic connection between pump 212 and the water intake 133 of the water heater 121. The pump 212 generates enough water pressure to transport the water from the reservoir 211: a) through the water feed connection 213; and, b) through the cleaning structure 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Ball Bearing: As used in this disclosure, a ball bearing is a spherical structure. One of the used of ball bearings is to form the rotating structure of rolling element bearings.

Bearing: As used in this disclosure, a bearing is a mechanical device that: 1) guides and limits the motion of a moving component relative to a fixed component; and, 2) reduces the friction between the moving component and the fixed component. A locking bearing is a bearing that can be locked such that the rotation of movements secured into a fixed position until the locking bearing is subsequently unlocked. The use of bearings is well known and documented in the mechanical arts.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Correspond: As used in this disclosure, the term correspond is used as a comparison between two or more objects wherein one or more properties shared by the two or more objects match, agree, or align within acceptable manufacturing tolerances.

Debris: As used in this disclosure, debris refers to an accumulation of unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drawer: As used in this disclosure, a drawer is a box or pan that is designed to slide into and out of a larger object.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fitting: As used in this disclosure, a fitting is a component that attaches a first object to a second object. The fitting is used to forming a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grate: As used in this disclosure, a grate is a: 1) a plurality of parallel metal bars; or, 2) a metal structure comprising mesh structure formed from metal bars.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Manifold: As used in this disclosure, a manifold is a pipe or chamber having several ports through which one or more fluids are gathered or distributed.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pressure: As used in this disclosure, pressure refers to a measure of force per unit area.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space;, b) maintains an environment suitable within the protected space that is appropriate for the object; or, c) protects the object within the protected space from potential dangers that are outside of the protected space.

Protection Space: As used in this disclosure, a protection space is a space formed by a boundary structure. The boundary structure forms a protective barrier that protects objects outside the protection space from potential dangers from the operation of a device or process contained within the protection space.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a fluid.

Rolling Element Bearing: As used in this disclosure, a rolling element bearing comprises is a type of bearing comprising an inner race, and outer race, and a plurality of ball bearings. The plurality of ball bearings are sphere shaped. The inner race is a circular ring. The outer race is a circular ring with an inner diameter that is greater than the outer diameter of the inner race. The plurality of ball bearings are placed between the inner race and the outer race such that: 1) the inner race and the outer race are coaxially positioned; and, 2) the inner race rotates relative to the outer race. Typically, the inner race attaches to a first object and the outer race attaches to a second object such that the first object rotates relative to the second object. Typically, a rolling element bearing is disk shaped. A rolling element bearing is said to be "locking" when the relative position of the inner race in be locked into a fixed position relative to the outer race. Rolling element bearings, including locking versions, are: 1) commercially available; and, 2) well-known and documented in the mechanical arts.

Rotary Union: As used in this disclosure, a rotary union is a commercially available plumbing fitting that forms fluidic connection between a stationary source and a rotating structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Slot: As used in this disclosure, a slot is a prism-shaped negative space formed as a groove or aperture that is formed in or through an object.

Solid: As used in this disclosure, a solid refers to a state (phase) of matter that: 1) has a fixed volume; and, 2) does not flow.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Temperature: As used in this disclosure, temperature refers to a relative measure of the kinetic and vibrational energy contained in the atoms and molecules of a first object (or system) relative to the kinetic and vibrational energy contained in the atoms and molecules of a second object (or system). When two objects (or systems) are in thermal equilibrium, the temperature of the two objects (or systems) is the same.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable grill grate washing machine comprising a containment structure, a cleaning structure, and a debris drawer;
    wherein the cleaning structure mounts in the containment structure;
    wherein the debris drawer inserts into the containment structure;
    wherein the portable grill grate washing machine is configured for use with a grate;
    wherein the debris drawer is a hollow structure with a pan shape;
    wherein an open face of the pan shape of the debris drawer forms a superior face of the debris drawer when the debris drawer is inserted into the containment structure;
    wherein the debris drawer forms an inferior structure contained within a hollow interior of the containment structure;
    wherein the debris drawer removably inserts into the containment structure through a grate slot of the containment structure;
    wherein the debris drawer forms an accumulating structure that collects the debris released from the grate by the cleaning structure.

2. The portable grill grate washing machine according to claim 1
    wherein the portable grill grate washing machine is a mechanical structure used to clean a grate;
    wherein the grate inserts into the containment structure for cleaning;
    wherein the cleaning structure sprays water cleans the grate by spraying water on the grate;
    wherein the debris drawer collects debris that is dislodged from the cleaning structure during the cleaning process.

3. The portable grill grate washing machine according to claim 2
    wherein the containment structure is a mechanical structure;
    wherein the containment structure is a hollow structure;
    wherein the containment structure creates a protection space;
    wherein the grate inserts into the containment structure.

4. The portable grill grate washing machine according to claim 3
    wherein the cleaning structure is a fluidic network;
    wherein the cleaning structure receives water from a source of water;
    wherein the source of water provides the water under pressure;
    wherein the cleaning structure controls the flow of water into the cleaning structure;
    wherein the cleaning structure heats the water as it enters the fluidic cleaning structure;
    wherein the cleaning structure transports the heated water to the grate;
    wherein the cleaning structure cleans the grate by discharging the transported water directly onto the grate.

5. The portable grill grate washing machine according to claim 4
    wherein the containment structure comprises a containment housing, a grate slot, a grate rest, and a debris drawer slot;
    wherein the grate slot, the grate rest, and the debris drawer slot are formed in the containment housing.

6. The portable grill grate washing machine according to claim 5 wherein the cleaning structure comprises a water heater, a plurality of spray structures, and a plurality of fluidic connectors;
wherein the water heater, the plurality of spray structures, and the plurality of fluidic connectors are fluidically interconnected.

7. The portable grill grate washing machine according to claim 6
wherein the containment housing is a hollow structure;
wherein the containment housing forms the primary shape of the containment structure;
wherein the containment housing forms the solid exterior surfaces of the containment structure;
wherein the containment housing forms the boundary structure of the protection space formed by the containment structure.

8. The portable grill grate washing machine according to claim 7
wherein the grate slot is a slot that is formed through the superior surface of the containment housing;
wherein the grate inserts into the protection space formed by the containment housing through the grate slot;
wherein the grate is removed from the protection space formed by the containment housing;
wherein the grate rest is a mechanical structure that is formed in the protection space formed by the containment housing;
wherein the grate rest is a horizontally oriented platform;
wherein the grate rests on the grate rest;
wherein the grate rest elevates the grate above the debris drawer when the grate is inserted into the containment housing.

9. The portable grill grate washing machine according to claim 8
wherein the debris drawer slot is a negative space that is formed through a vertically oriented face of the containment housing;
wherein the debris drawer slot provides access into the protection space formed by the containment housing;
wherein the debris drawer inserts into and is removed from the protection space formed by the containment housing through the debris drawer slot.

10. The portable grill grate washing machine according to claim 9
wherein the water heater forms a fluidic connection between the source of pressurized water and the plurality of fluidic connectors;
wherein the water heater receives the water from the source of pressurized water;
wherein the water heater heats the received water;
wherein the water heater transports the heated water under pressure to the plurality of fluidic connectors.

11. The portable grill grate washing machine according to claim 10
wherein the water heater comprises a flow control, a temperature control device, a water intake, and a discharge manifold;
wherein the water intake is a fitting that forms a fluidic connection between the flow control and the source of pressurized water;
wherein the flow control is a mechanical structure that controls the volume of the flow of the water received from the source of pressurized water into the temperature control device;
wherein the temperature control device is device that heats the water received from the source of pressurized water to a predetermined temperature before the water flows into the discharge manifold;
wherein the discharge manifold is a manifold that transports the heated water from the temperature control device into the plurality of fluidic connectors;
wherein the discharge manifold forms a fluidic connection with the temperature control device;
wherein the discharge manifold forms a fluidic connection with each fluidic connector contained in the plurality of fluidic connectors.

12. The portable grill grate washing machine according to claim 11
wherein the plurality of spray structures comprises a collection of individual spray structures;
wherein each individual spray structure selected from the plurality of spray structures is a mechanical structure;
wherein each individual spray structure selected from the plurality of spray structures is contained within the protection space formed by the containment housing;
wherein each individual spray structure selected from the plurality of spray structures forms a fluidic connection with a fluidic connector selected from the plurality of fluidic connectors;
wherein each individual spray structure selected from the plurality of spray structures receives the heated water under pressure from the selected fluidic connector;
wherein each individual spray structure selected from the plurality of spray structures discharges the received heated water directly on the grate inserted into the protection space formed by the containment housing;
wherein each individual spray structure selected from the plurality of spray structures is a rotating structure;
wherein the rotation of each individual spray structure ensures that the heated water discharged by the individual spray structure is evenly distributed over the grate;
wherein each individual spray structure selected from the plurality of spray structures is identical.

13. The portable grill grate washing machine according to claim 12
wherein each individual spray structure comprises a collection of spray structure intake, a spray structure rotary union, a first spray arm, and a second spray arm;
wherein the spray structure intake is a fitting;
wherein the spray structure intake forms the fluidic connection between the spray structure rotary union of the individual spray structure and the fluidic connector associated with the individual spray structure;
wherein the spray structure intake transports the heated water received from the associated fluidic connector and to the spray structure rotary union.

14. The portable grill grate washing machine according to claim 13
wherein the spray structure rotary union is a rotary union;
wherein the spray structure rotary union forms a fluidic connection with spray structure intake;
wherein the spray structure rotary union forms a fluidic connection with first spray arm;
wherein the spray structure rotary union forms a fluidic connection with second spray arm;
wherein the spray structure rotary union transports the heated water received from the spray structure intake to both the first spray arm and the second spray arm;
wherein the spray structure rotary union further diverts some of the momentum of the mass flow of the heated water flowing through the spray structure intake to rotate both the first spray arm and the second spray arm.

15. The portable grill grate washing machine according to claim 14
   wherein the portable grill grate washing machine further comprises a reservoir structure;
   wherein the reservoir structure is a source of pressurized water;
   wherein the reservoir structure feeds pressurized water into cleaning structure.

16. The portable grill grate washing machine according to claim 15
   wherein the reservoir structure comprises a reservoir, a pump, and a water feed connection;
   wherein the pump forms a fluidic connection between the reservoir and the water feed connection;
   wherein the reservoir forms a protected space that is used to store the water used to supply the cleaning structure;
   wherein the pump generates a pressure differential that transports the water from the reservation into the water feed connection;
   wherein the water feed connection forms a fluidic connection between pump and the water intake of the water heater.

\* \* \* \* \*